(12) United States Patent
Bryant

(10) Patent No.: US 8,602,348 B2
(45) Date of Patent: Dec. 10, 2013

(54) FLYING-WING AIRCRAFT

(76) Inventor: Ashley Christopher Bryant, Taplow (GB)

(*) Notice: Subject to any disclaimer, the term of this patent is extended or adjusted under 35 U.S.C. 154(b) by 82 days.

(21) Appl. No.: 12/865,429

(22) PCT Filed: Feb. 2, 2009

(86) PCT No.: PCT/GB2009/000280
§ 371 (c)(1),
(2), (4) Date: Jul. 30, 2010

(87) PCT Pub. No.: WO2009/095696
PCT Pub. Date: Aug. 6, 2009

(65) Prior Publication Data
US 2011/0001001 A1    Jan. 6, 2011

(30) Foreign Application Priority Data

Feb. 1, 2008  (GB) .................................. 0801913.5
Aug. 19, 2008 (GB) .................................. 0815100.3

(51) Int. Cl.
*B64C 15/12* (2006.01)
*B64C 29/00* (2006.01)
*B64C 39/10* (2006.01)

(52) U.S. Cl.
USPC .............. 244/12.4; 244/23 B; 244/56; 446/36

(58) Field of Classification Search
USPC ......... 244/12.4, 56, 36, 7 R, 7 C, 23 R, 23 B, 244/23 D; 446/36, 37–44, 35
See application file for complete search history.

(56) References Cited

U.S. PATENT DOCUMENTS

| | | | | |
|---|---|---|---|---|
| 2,926,869 A | * | 3/1960 | Sullivan | 244/12.4 |
| 2,961,189 A | * | 11/1960 | Doak | 244/12.4 |
| 2,989,269 A | * | 6/1961 | Le Bel | 244/12.3 |
| 2,991,026 A | * | 7/1961 | Nelson et al. | 244/12.4 |
| 3,066,888 A | * | 12/1962 | Doak | 244/12.1 |
| 3,083,935 A | * | 4/1963 | Piasecki | 244/12.3 |
| 3,155,342 A | * | 11/1964 | Ludwig et al. | 244/12.5 |

(Continued)

FOREIGN PATENT DOCUMENTS

GB        920 875        3/1963

OTHER PUBLICATIONS

U.S. Centennial of Flight Commission, Stability, Apr. 30, 2003, pp. 1-2.*

*Primary Examiner* — Joseph W Sanderson
*Assistant Examiner* — Timothy Schwarz
(74) *Attorney, Agent, or Firm* — Davis & Bujold, PLLC; Michael J. Bujold

(57) ABSTRACT

A vertical take-off and landing flying-wing aircraft has a pair of thrust-vectoring propulsion units mounted fore and aft of the aircraft pitch axis on strakes at opposite extremities of the wing-structure, with the fore unit below, and the aft unit above, the wing-structure. The propulsion units are pivoted to the strakes, either directly or via arms, for individual angular displacement for thrust-vectored maneuvering of the aircraft in yaw, pitch and roll and for hover and forward and backward flight. When arms are employed, the arms of fore and aft propulsion units are intercoupled via chain drives or linkages. The wing-structure may have fins, slats and flaps and other aerodynamic control-surfaces, and enlarged strakes may incorporate rudder surfaces. Only one propulsion unit may be mounted at each extremity and additional fan units may be used.

20 Claims, 12 Drawing Sheets

(56) References Cited

U.S. PATENT DOCUMENTS

| | | | |
|---|---|---|---|
| 3,181,810 A * | 5/1965 | Olson | 244/7 R |
| 3,231,221 A * | 1/1966 | Platt | 244/12.4 |
| 3,260,477 A * | 7/1966 | Grahame | 244/12.3 |
| 3,284,027 A * | 11/1966 | Mesniere | 244/12.4 |
| 3,321,022 A * | 5/1967 | Yoshiyuki | 416/112 |
| 3,360,217 A * | 12/1967 | Trotter | 244/12.4 |
| 4,678,141 A * | 7/1987 | Sarrantonio | 244/2 |
| 5,419,514 A * | 5/1995 | Ducan | 244/12.4 |
| 6,655,631 B2 * | 12/2003 | Austen-Brown | 244/12.4 |
| 6,719,244 B1 * | 4/2004 | Gress | 244/7 R |
| 7,789,342 B2 * | 9/2010 | Yoeli | 244/23 B |
| 7,959,104 B2 * | 6/2011 | Kuntz | 244/2 |
| 2003/0080242 A1 * | 5/2003 | Kawai | 244/12.4 |
| 2006/0016930 A1 * | 1/2006 | Pak | 244/12.4 |
| 2007/0018035 A1 | 1/2007 | Saiz et al. | |
| 2011/0001001 A1 * | 1/2011 | Bryant | 244/12.5 |

* cited by examiner

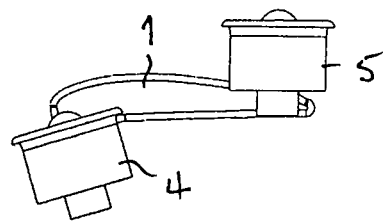 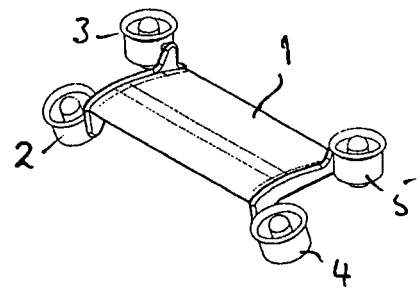
Fig. 5a　　　　　　　　Fig. 5b
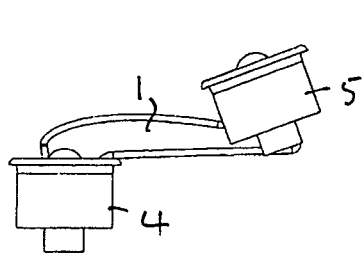 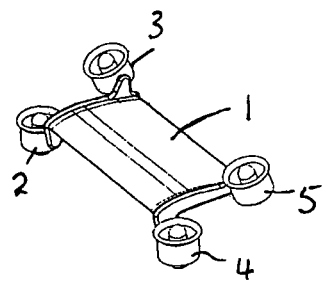
Fig. 6a　　　　　　　　Fig. 6b
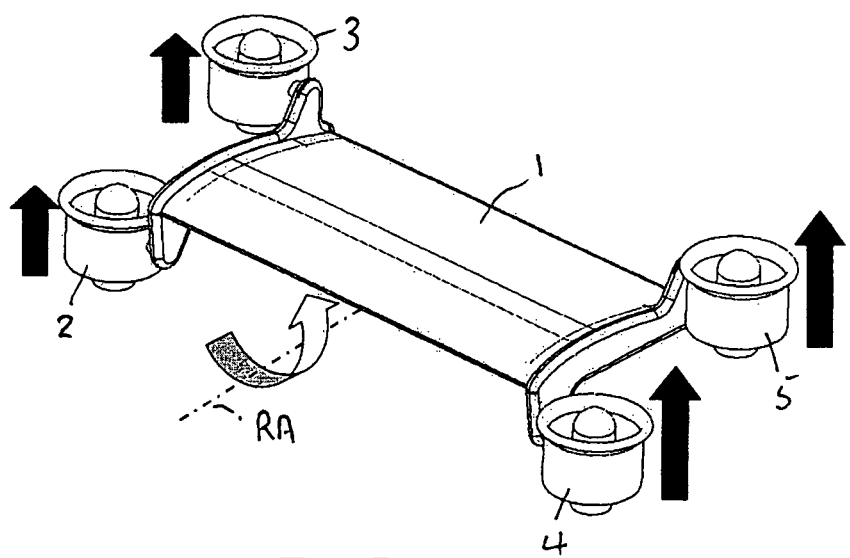
Fig. 7

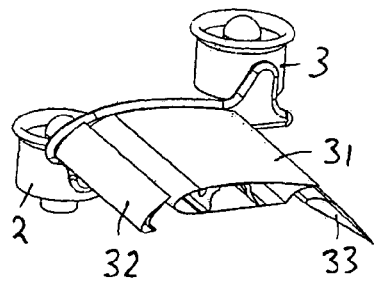
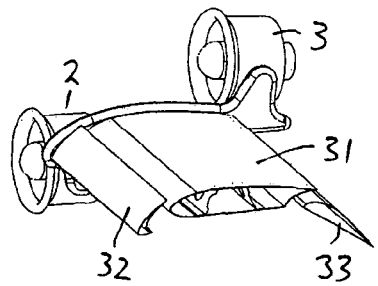
Fig. 14a  Fig. 14b
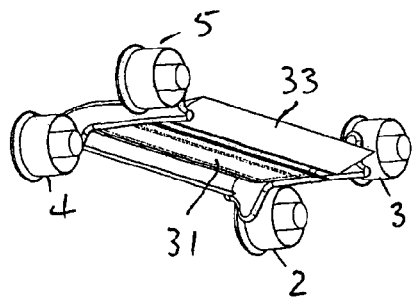
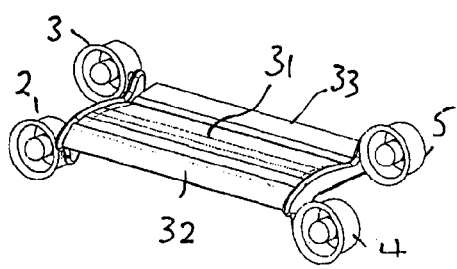
Fig. 15a  Fig. 15b
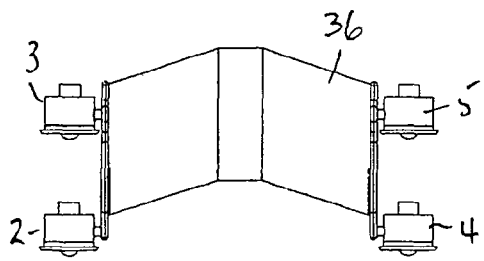
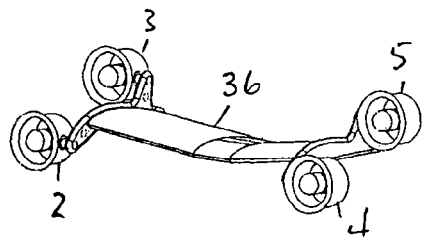
Fig. 16a  Fig. 16b
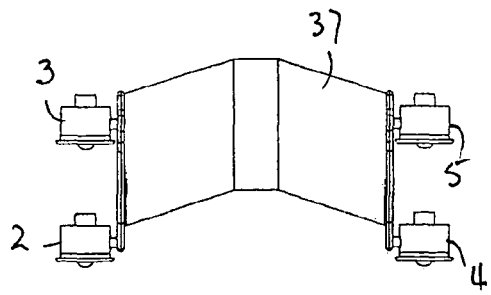
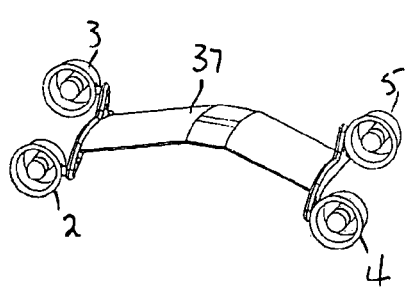
Fig. 17a  Fig. 17b

FLYING-WING AIRCRAFT

This application is a National Stage completion of PCT/GB2009/000280 filed Feb. 2, 2009, which claims priority from British patent application serial nos. 0815100.3 filed Aug. 19, 2008 and 0801913.5 filed February 1, 2008.

FIELD OF THE INVENTION

This invention relates to flying-wing aircraft and is concerned in particular with flying-wing aircraft that have a vertical take-off and landing (VTOL) capability.

BACKGROUND OF THE INVENTION

VTOL flying-wing aircraft are advantageous for flight operations in such diverse fields as, for example, agriculture, mapping, surveillance, the oil and gas industry, energy distribution networks, emergency services (police, fire and ambulance), homeland security, the engineering and construction industries and disaster recovery.

SUMMARY OF THE INVENTION

According to the present invention there is provided a VTOL flying-wing aircraft wherein thrust-vectoring propulsion units mounted at opposite extremities of the wing-structure laterally either side of the fore-aft axis of the aircraft, and each thrust-vectoring propulsion unit being operable to vector thrust produced by it selectively and variably between downwards for lift and rearwards for forward flight.

Each of the thrust-vectoring propulsion units may also be operable to vector thrust produced by it selectively and variably forwards for rearward manoeuver or flight of the aircraft.

Where two or more mutually-spaced thrust-vectoring propulsion units are mounted at each of the opposite extremities of the wing-structure, each may be operable to vector its thrust angularly about an axis parallel to the pitch axis of the aircraft. More especially, one or more pairs of thrust vectoring propulsion units may be located at each of the opposite extremities of the wing-structure, and the two propulsion units of each pair may be spaced equidistant forward and aft respectively of the center of gravity of the aircraft. The axes about which the thrusts of the two propulsion units of each pair are vectored may be located one below and one above the central plane of the wing-structure. These axes may be fixed with respect to the wing-structure, but as an alternative may be displaceable with respect to it.

As an alternative, there may be just one thrust-vectoring propulsion unit mounted at each of the opposite extremities of the wing-structure, and in these circumstances each may be operable to vector its thrust angularly about both an axis parallel to the roll axis of the aircraft and the pitch axis and an axis of the aircraft or an axis parallel to the pitch axis. Both propulsion units may be mounted forward of the aerodynamic center of lift of the wing-structure.

The center of gravity of the flying-wing aircraft of the invention may for example be located within a range of 0 to 15% of the maximum wing chord, forward of the aerodynamic centre of lift of the wing-structure, the specific distance chosen being dependent upon the level of 'stability' or 'instability' and flight performance, required of the aircraft.

The thrust-vectoring propulsion units, which may for example be ducted-fan or exposed-rotor units with or without variable-pitch fan/rotor blades, may be powered by an electric motor or alternatively by a liquid-fuel combustion engine (for example, a two-stroke, four-stroke or turbo-shaft engine).

The magnitudes of thrust produced by the respective propulsion units may be individually controlled, but where, for example, there are four propulsion units, two mounted on each extremity of the wing-structure, thrust-magnitude control may be exercised on the units individually or on individual pairs of the units. The pairings in the latter circumstances where there are two units mounted on either extremity may be selectively: of the front unit with the rear unit on each side; of the front unit on each side with the rear unit of the other side; or of the front units with one another and the rear units with one another. Variation of the thrust-magnitude produced by each propulsion unit may be by varying engine speed (revolutions per minute), or, for example, by changing fan, propeller or rotor-blade pitch, or a combination of both speed and pitch.

Where there are four propulsion units, two mounted on each extremity of the wing-structure, control of thrust-vectoring of the propulsion units may be exercised individually, or on pairs of the units. In the latter respect the pairings may be, selectively: of the front unit with the rear unit on each side; of the front unit on each side with the rear unit of the other side; or of the front units with one another and the rear units with one another.

Control of the aircraft in roll, pitch, yaw and speed may be effected by selective regulation of the thrust-magnitudes produced by the propulsion units individually or in pairs and/or by selective regulation of the thrust-vectoring they provide individually or in pairs.

Thrust-vectoring by the propulsion units may be achieved at least in part by deflection from the units using, for example, angularly-displaceable nozzles or vanes. However, it may be achieved at least in part by angular displacement of the unit as a whole relative to the wing-structure. In either case, steps may be taken to ensure that adverse gyroscopic/inertial effects that might be experienced as a consequence of the rotation of fans or rotors from multiple propulsion units are as far as possible balanced out. This may be achieved by having alternate clockwise and counter-clockwise rotating fans or rotors.

Where thrust-vectoring by one or more of the propulsion units is achieved in whole or in part by angular displacement of the unit as a whole relative to the wing-structure, this angular displacement may be about an axis which is fixed relative to the wing-structure and which may be the pitch axis of the aircraft or an axis parallel to the pitch axis. The mounting of the unit may be directly on this fixed axis or on an arm or other member that pivots about that axis. Where the propulsion unit is mounted on a pivotal arm or other member, that mounting may be fixed, or it may enable angular displacement of the unit relative to the arm or other member so that the unit can be controlled in orientation about two axes; both axes may be parallel to the pitch axis of the aircraft. Drive for the pivotal movement of the arm or other member may be, for example, via gear, chain or lever mechanism.

Where pairs of propulsion units are involved and each unit is mounted for angular displacement for vectoring on a pivotal arm or other member, the pivoting of the arm or other member may be controlled for the full forward-flight condition to bring about a disposition of the two units of each pair in which one is located above, and the other is located below, the wing-structure (or more generally, above and below a general plane of that structure), whereas for the hover condition the pivoting may be controlled to bring about the disposition in which the two units are in horizontal alignment with one another. More especially, the pivoting into this horizontal alignment for hover may be such as to fold the two units away from one another (so that their pivoting axes are located between the two units in the hover condition). This latter disposition provides greater stability and balance, while for the full forward-flight condition folding of the units into the disposition in which one unit (for example, the rearmost of the pair) is above the other brings about a more compact configuration.

The wing-structure of the flying-wing aircraft of the invention may have anhedral or dihedral, be swept forward or swept backwards and/or may have slats or other aerodynamic elements which may or may not incorporate control surfaces (for example flaps, ailerons or flaperons); where control surfaces are involved, they may be used, in whole or in part, for control of aircraft pitch, yaw, roll and speed. Furthermore, the wing-structure may have one or more central, stabiliser tail-fins or a V-tail, and as such may, or may not, incorporate control surfaces (elevators, elevons, rudders or ruddervators) for use in whole or part for control of aircraft pitch and yaw.

The configuration of the thrust-vectoring propulsion units on the wing-structure and the manner in which they are operated, desirably results in the aircraft having highly-decoupled pitch, roll and yaw control characteristics, so that the flight-control system required is simple to design, implement and operate.

The thrust-vectoring VTOL flying-wing aircraft of the invention may have manned and/or unmanned flight capabilities, and may have flight-control facilities to enable smooth transition to and from hover in vertical take-off and landing, excellent gust response and high manoeuvrability in both hover and forward flight. The aircraft furthermore, especially where designed to have minimum weight, has potential for long-endurance flight, a broad and continuous speed range, and an ability to operate in challenging environments typically associated with urban or maritime operations. Moreover, it may have the ability to fly backwards.

Furthermore, the thrust-vectoring VTOL flying-wing aircraft of the invention may be adapted to carry passengers, cargo and/or supplies, and in embodiments of smaller size may function as an unmanned aerial vehicle (UAV) or platform for aerial viewing and/or surveillance, aerial photography or aerial target-tracking, and may incorporate aerial sensing and/or measuring capabilities (for example embracing infra-red and/or other optical sensing, and/or chemical, biological, and/or acoustic sensing).

The present invention enables the provision of a VTOL flying-wing aircraft that is capable of: vertical take-off and landing at almost any location, whether it be stationary or moving (such as the deck of a ship in motion); flying safely in close proximity to obstacles and other aircraft and within enclosed spaces, with a high degree of manoeuvrability and gust-response handling; and being readily manufactured in multiple variants to meet a wide range of operational environments and functional capabilities.

BRIEF DESCRIPTION OF THE DRAWINGS

Thrust-vectoring flying-wing VTOL aircraft according to the present invention will now be described, by way of example, with reference to the accompanying drawings, in which:

FIGS. 5a and 5b are illustrative in side-elevation and perspective view respectively, of the flying-wing aircraft of FIG. 1, showing the orientations of the individual propulsion units for pitching the aircraft up when in hover;

FIGS. 6a and 6b correspond to FIGS. 5a and 5b respectively, showing the orientations of the individual propulsion units for pitching the aircraft down when in hover;

FIG. 7 is illustrative in perspective view of the flying-wing aircraft of FIG. 1, showing the orientations of the individual propulsion units for rolling the aircraft using a differential-thrust technique when in hover;

FIGS. 14a and 14b are sectional perspective views of the flying-wing aircraft of FIG. 1 when modified according to the present invention to incorporate a slat and flap for increased lift, FIG. 14a illustrating the condition for hover, and FIG. 14b the condition for forward flight;

FIGS. 15a and 15b are, respectively, perspective views from below and above of the modified flying-wing aircraft of FIGS. 14a and 14b when using the rearward split-flap as an elevator for pitch control;

FIGS. 16a and 16b illustrate in plan and perspective view respectively, a configuration of flying-wing aircraft according to the present invention having a swept-forward dihedral wing;

FIGS. 17a and 17b illustrate in plan and perspective view respectively, a configuration of flying-wing aircraft according to the present invention having a swept-forward anhedral wing;

DETAILED DESCRIPTION OF THE PREFERRED EMBODIMENTS

Figure 1:
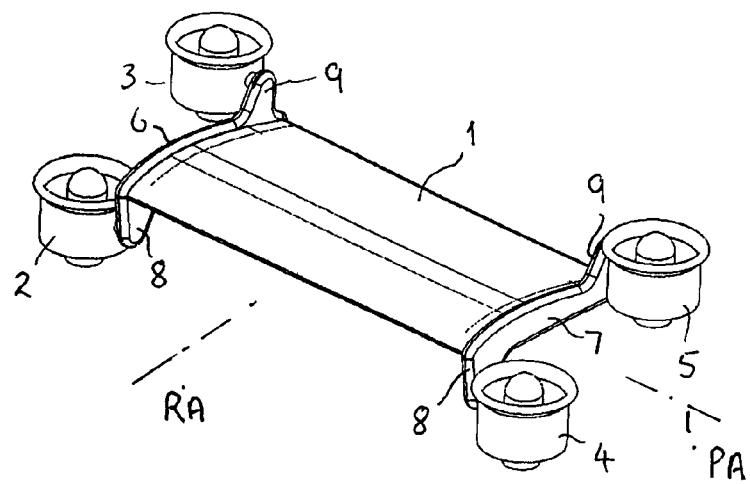
FIG. 1 is a perspective view illustrative of a thrust-vectoring VTOL flying-wing aircraft according to the present invention.

Referring to FIG. 1, the VTOL flying-wing aircraft in this example has a wing-structure 1 that carries four thrust-vectoring propulsion units 2 to 5. The propulsion units 2 and 3 are carried fore and aft respectively of a strake 6 that is mounted on the starboard extremity or wing-tip of the wing-structure 1, and the units 4 and 5 are correspondingly carried fore and aft of a strake 7 that is mounted on the port extremity or tip of the structure 1. The units 2 and 4 are mounted to the fore of the wing-structure 1 on downwardly-projecting mounting structures 8 of their respective strakes 6 and 7, whereas the units 3 and 5 are mounted to the rear of the structure 1 on mounting structures 9 that are upwardly-projecting from the respective strakes 6 and 7.

The propulsion units 2 to 5 are rotatably mounted on the strakes 6 and 7 to enable the thrust each produces to be vectored to the extent necessary, for example throughout 360 degrees, about an axis parallel to the pitch axis PA of the wing-structure 1. In particular, as illustrated in FIG. 1, they may be rotated individually (by control motors not shown) to vector the thrust produced vertically downwards, and controlled individually (by thrust-management systems not shown) to sustain thrust magnitudes for stable hover. Power consumption by the units 2 to 5 for hover is most economical when thrust is vectored downwards in this way. Each unit 2 to 5 can be angularly displaced about its rotation axis to vary the thrust vectoring it provides differentially or otherwise relative to the vectoring provided by one or more of the other units 2 to 5. More especially, they may for example be all vectored partly downwards and forwards to provide reverse thrust for manoeuvring and braking purposes when transitioning from forward flight to a stable hover, and differentially for yaw, pitch and roll.

More details of the construction of the VTOL flying-wing aircraft of FIG. 1 and some possible alternatives will now be described with reference to FIG. 2 in which the propulsion units 2 to 5 are each shown rotated to vector the thrust rearwards for forward flight.

Figure 2:
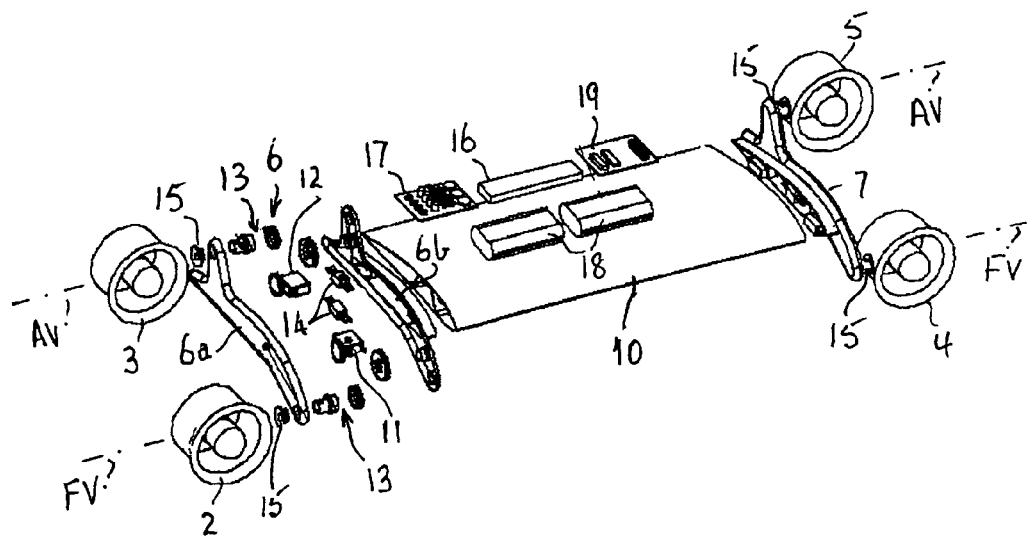
FIG. 2 is an exploded view of the thrust-vectoring VTOL flying-wing aircraft of FIG. 1 showing major components of the aircraft.

Referring to FIG. 2, the wing-structure 1 is of aerofoil section but may differ from this (for example it may be of planoform section), and instead of having a straight leading edge 10 as illustrated, may be swept forwards or backwards with or without anhedral or dihedral. Furthermore, it may incorporate slats, flaps and control surfaces such as for example one or more elevators, flaperons, ailerons or elevons.

The center of gravity of the aircraft typically lies within the range of 0% to 15% of wing-chord distance in front of the aerodynamic centre of lift of the wing-structure 1. The forward pair of thrust-vectoring propulsion units 2 and 4 have a common axis FV of vector-rotation that is of the same distance in front of the centre of gravity as the corresponding, common axis AV of the rearward pair of units 3 and 5 is behind it. The units 2 and 3 mounted on the strake 6 are driven about their axes FV and AV by individual electric servo-motors 11 and 12 acting via gear trains 13 and 14 respectively. The servo-motors 11 and 12 together with their individual gear trains 13, and the electronic controllers 14 controlling the magnitudes of thrust produced by the propulsion units 2 and 3, are all housed within outer casings 6a and 6b of the strake 6. Corresponding servo-motors, gear trains and controllers for the units 4 and 5 are housed within the strake 7.

Each propulsion unit 2 to 5 has an individual sensor 15 for sensing its angular position about its axis FV or AV and for supplying signals in accordance with this to a servo-motor control unit 16. The unit 16 signals control-commands to the servo-motors within the strakes 6 and 7 for regulating the angular dispositions of the units 2 to 5 appropriately, and the thrust produced by them, under overall control of a flight-control computer 17. Inertial and other measurements related to attitude and other flight variables are fed to the computer 17 from units 18, and electrical power for the flying-wing aircraft as a whole is provided by LiPo (lithium polymer) rechargeable batteries 19. Alternative sources of power may include new and emerging power-source technologies such as, but not limited to, hydrogen fuel cell systems. The surfaces of the wing-structure may incorporate solar panels to support power generation during hover and flight.

Although the flying-wing aircraft of the invention has been described with reference to FIGS. 1 and 2 in the context of having a four-unit thrust-vectoring propulsion system, the aircraft may instead have just two thrust-vectoring propulsion units. The axes of rotation applicable for thrust-vectoring operations in this latter case where the two propulsion units are mounted at opposite wing-tips of the wing-structure will now be described with reference to FIG. 3. Only the port wing-tip with its vectored-thrust propulsion unit is shown in FIG. 3.

Figure 3:
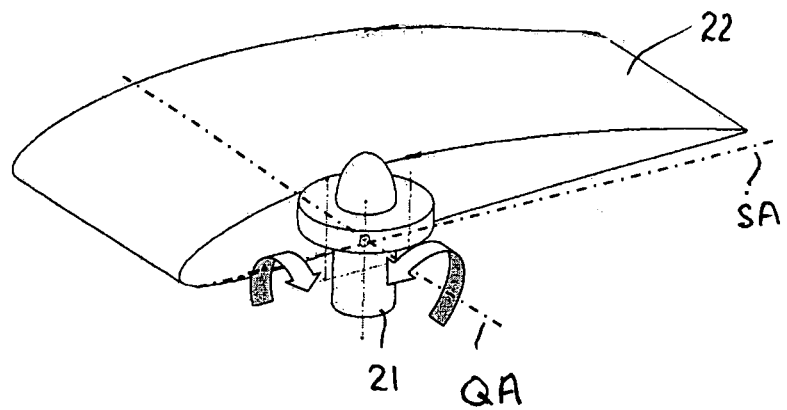
FIG. 3 is illustrative of one of two thrust-vectoring propulsion units of a flying-wing aircraft according to the present invention, showing axes about which the propulsion unit is angularly displaceable.

Referring to FIG. 3, the thrust-vector propulsion unit 21 is installed at the port tip of the wing-structure 22 forward of the centre-of-lift and the centre of gravity. The thrust-vectoring propulsion unit 21 is rotatable about a primary axis QA parallel to the axis of the wing-span, as well as, when appropriate, about a secondary axis SA parallel to the axis of the wing-chord, so as to provide complete platform control authority.

Figure 4:
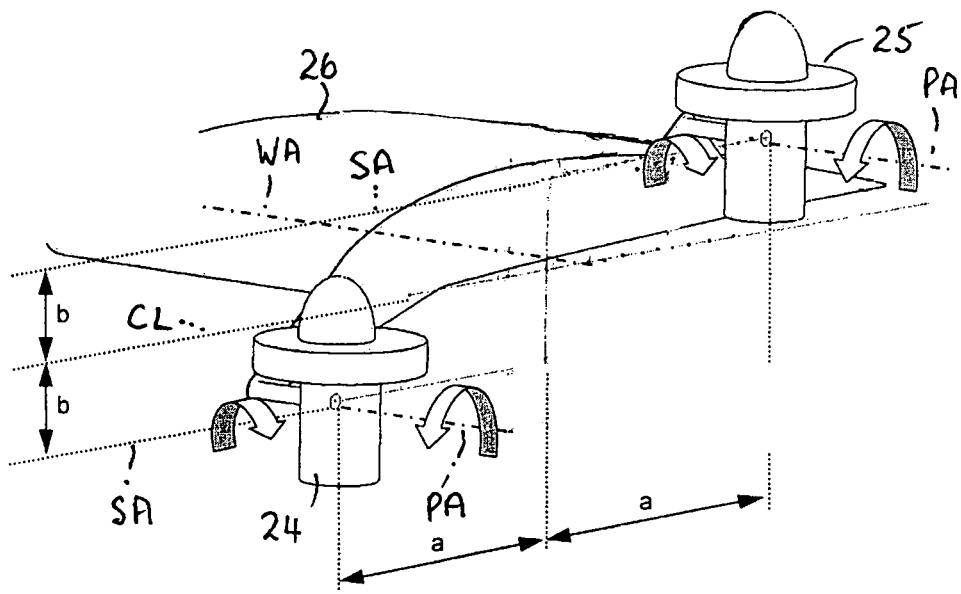
FIG. 4 is illustrative of two of four thrust-vectoring propulsion units of a flying-wing aircraft according to the present invention, and shows axes about which the propulsion units are angularly displaceable individually.

FIG. 4 shows the installation detail and rotation axes of a four-unit thrust-vectoring propulsion system corresponding to that of the aircraft of FIG. 1. Only the port wing-tip with its two vectored-thrust propulsion units is shown in FIG. 4.

Referring to FIG. 4, the two thrust-vectoring propulsion units 24 and 25 are located at the tip of the wing-structure 26, typically with equal spacings a fore and aft respectively, of the wing-span axis WA (which extends through the centre-of-lift axis of the wing). The forward unit 24 is typically located below the centre line CL of the wing-structure, whereas the rearward unit 25 is typically located with equal spacing b above it. The thrust-vectoring propulsion units 24 and 25 are rotatable about individual primary axes PA parallel to the axis WA, as well as being rotatable, when appropriate, about individual secondary axes SA parallel to the axis of the wing-chord, so as to provide complete platform control authority. Rotation about the secondary axes SA is in general not required in the context of four-unit thrust-vectoring propulsion systems.

It has been found possible in the construction of thrust-vectoring VTOL flying-wings, to manufacture many of the components from either a composite (such as carbon fiber, or the fiber material sold under the registered trade mark KEVLAR), or by using a plastic injection-moulding process. This enables weight to be kept to a minimum while ensuring maximum structural strength and integrity of the aircraft. The flying-wing structure, the inner and outer wing strakes, the internal gear trains and the thrust-vectoring propulsion units may be manufactured in the same way.

Thrust-vectoring VTOL flying-wings according to the present invention can perform advanced flight manoeuvres, including as well as vertical take-off and landings, controlled transitions to forward flight, maintaining any flight speed from the hover through to top speed, and transitioning back to hover as well as flying backwards. In addition to these core VTOL manoeuvres, controlled side slip, yaw, pitch up or down whilst stationary in the hover are also available as well as multiple combinations of all of these.

Various flight operations of the flying-wing aircraft of FIG. 1 will now be described with reference to FIGS. 5 to 13.

Referring to FIGS. 5a and 5b, the dispositions of the propulsion units 2 to 5, with the forward units 2 and 4 rotated to incline their thrusts partly rearwardly from the vertical while the thrusts of the rearward units 3 and 5 remain vertically down, pitches the aircraft up in the hover.

In FIGS. 6a and 6b, the rearward units 3 and 5 are shown rotated to incline their thrusts partly rearwards from the vertical while the thrusts of the forward units 2 and 4 remain vertically down. This pitches the aircraft down in the hover.

FIG. 7 illustrates the situation in which during hover of the aircraft the thrust-vectoring propulsion units 4 and 5 generate slightly more thrust than the units 2 and 3, with the result that the aircraft will start to roll as indicated in an anticlockwise direction about its roll axis RA.

Figure 8A:
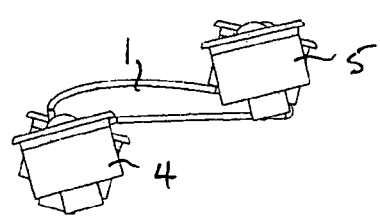
FIGS. 8a and 8b are illustrative in side-elevation and perspective view respectively, of the flying-wing aircraft of FIG. 1, showing the orientations of the individual propulsion units for yaw of the aircraft when in hover.
Figure 8B:
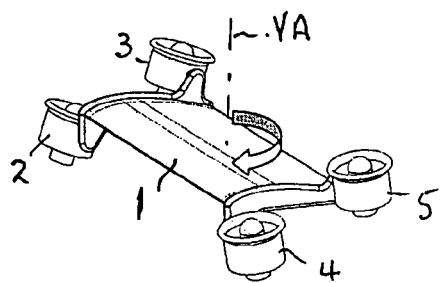

In FIGS. 8a and 8b, the propulsion units 4 and 5 are shown rotated to vector their thrusts inclined slightly rearwardly to the downward vertical whereas the units 2 and 3 are rotated to incline their thrusts slightly forwardly of the downward vertical. The result is to turn the aircraft during hover in a clockwise sense about its yaw axis YA.

Figure 9A:
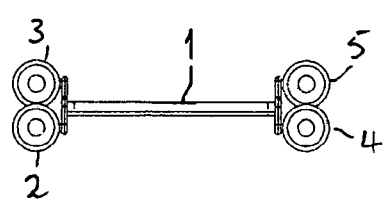
FIGS. 9a and 9b are illustrative in front-elevation and perspective view respectively, of the flying-wing aircraft of FIG. 1, showing the orientations of the individual propulsion units for forward flight of the aircraft.
Figure 9B:
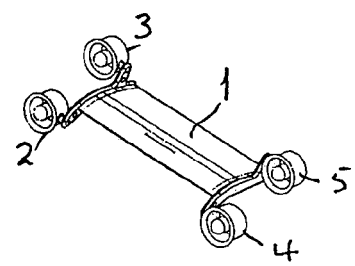
Figure 10A:
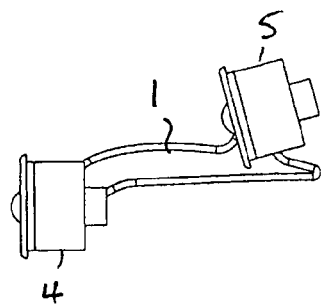
FIGS. 10a and 10b are illustrative in side-elevation and perspective view respectively, of the flying-wing aircraft of FIG. 1, showing the orientations of the individual propulsion units for pitching the aircraft up when in forward flight.
Figure 10B:
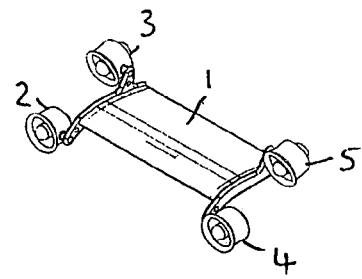
Figure 11A:
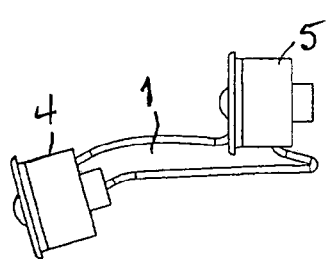
FIGS. 11a and 11b correspond to FIGS. 10a and 10b respectively, showing the orientations of the individual propulsion units for pitching the aircraft down when in forward flight.
Figure 11B:
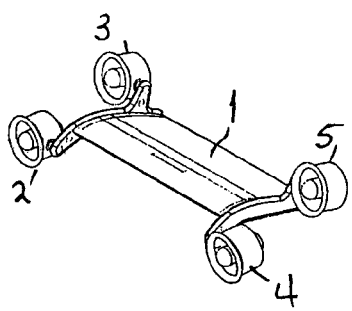

FIGS. 9a and 9b show the propulsion units 2 to 5 all rotated to vector their thrusts fully rearwards. This is the configuration for full forward flight in the circumstances where the wing-structure 1 is providing adequate aerodynamic lift capable of sustaining the entire aircraft in its flight. From this condition, rotation of the units 3 and 5 to vector their thrusts slightly upward, as illustrated in FIGS. 10a and 10b, results in the aircraft pitching up into a climb. Where instead there is rotation of the units 2 and 4 to vector their thrusts slightly upward, as illustrated in FIGS. 11a and 11b, the aircraft pitches downward into a descent.

Figure 12:
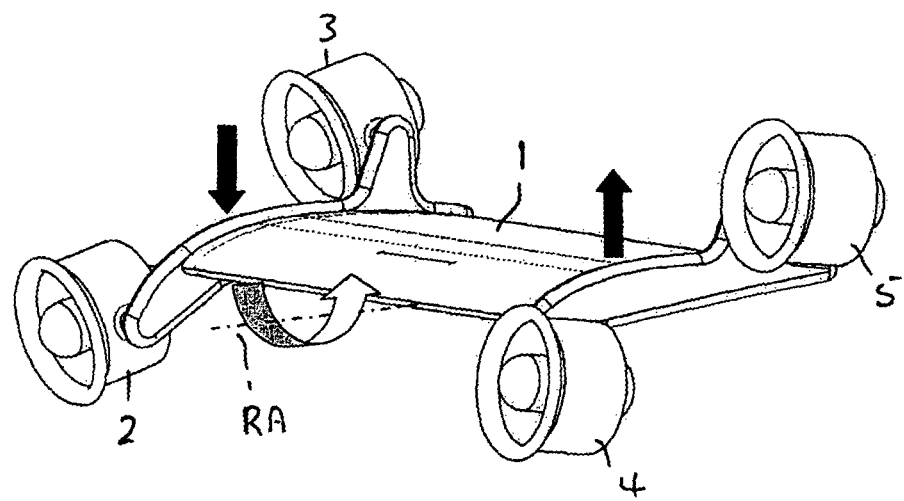
FIGS. 12 and 13 are illustrative in perspective view of the flying-wing aircraft of FIG. 1, showing the orientations of the individual propulsion units for roll and yaw respectively, when in forward flight of the aircraft.
Figure 13:
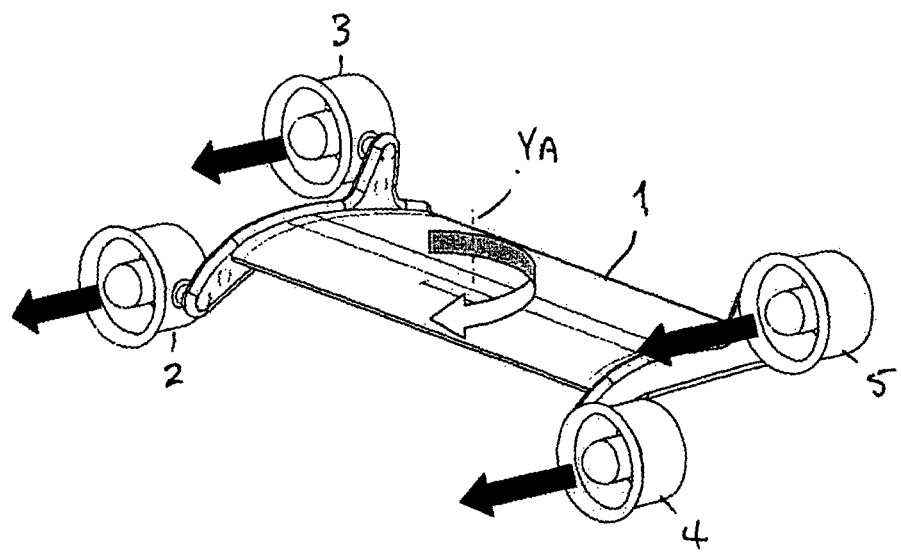

While the aircraft is in forward flight with the units 2 to 5 rotated as illustrated in FIGS. 9a and 9b, rotation of the units 2 and 3 to vector their thrusts slightly upwards, and of the units 4 and 5 to vector their thrusts slightly downwards, as illustrated in FIG. 12, the aircraft will roll about its roll axis RA. If instead of rotating the units 2 to 5, they remain as illustrated in FIGS. 9a and 9b, but the thrusts from the units 4 and 5 are increased by increasing their fan speed, as illustrated in FIG. 13, the aircraft will turn about its yaw axis YA during flight.

A modification of the thrust-vectoring VTOL flying-wing aircraft of FIG. 1 is illustrated in FIGS. 14a, 14b, 15a and 15b, in which the modified wing-structure 31 incorporates a slat 32 and flap 33. This increases significantly the coefficient of lift ($C_L$), and therefore the lift produced with forward speed. As the aircraft transitions from the hover condition (illustrated in FIG. 14a) to forward flight (illustrated in FIG. 14b), less power is therefore required of its thrust-vectoring units 2 to 5 than of those of the unmodified wing-structure 1, for maintaining the aircraft in the air, since a greater proportion of lift is now generated as aerodynamic lift from the wing-structure itself.

FIGS. 15a and 15b illustrate use of the flap 33 as an elevator for adjusting the pitch of the modified aircraft while the aircraft is in forward flight. The flap/elevator 33 does not need necessarily to be a single structure and could be split in such a way that it can also function as an air brake, or additionally provide flap and aileron capability for inducing roll as well as acting as an elevator for pitch control.

Modification of the flying-wing aircraft of FIG. 1 to have a swept-forward wing-structure 36 with dihedral is illustrated by FIGS. 16a and 16b. This modification is likely to improve roll stability and gust response.

An alternative modification to provide a swept-forward wing-structure 37 with anhedral is illustrated by FIGS. 17a and 17b. With this modification roll stability is likely to be more sensitive, but vertical-lift characteristics may well be improved.

Figure 18:
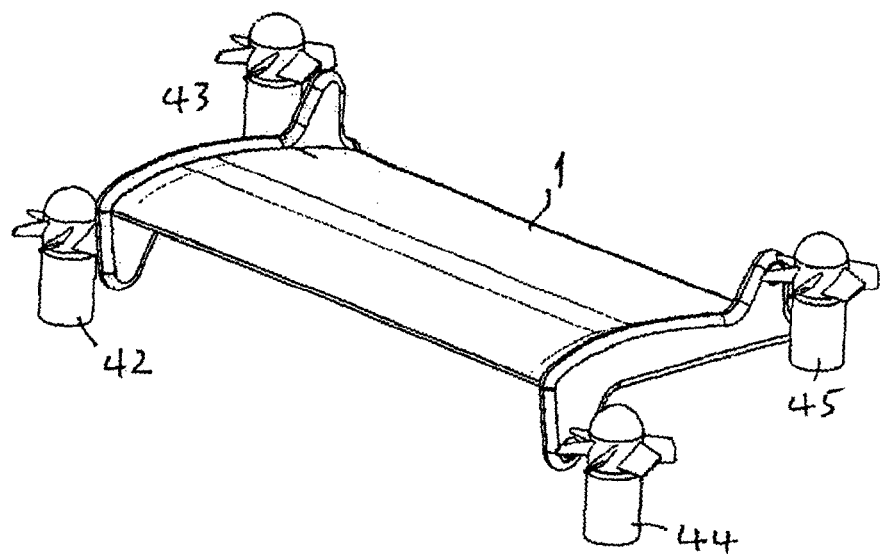
FIGS. 18 to 21 are perspective views illustrating possible modifications according to the present invention, of the flying-wing aircraft of FIG. 1.
Figure 19:
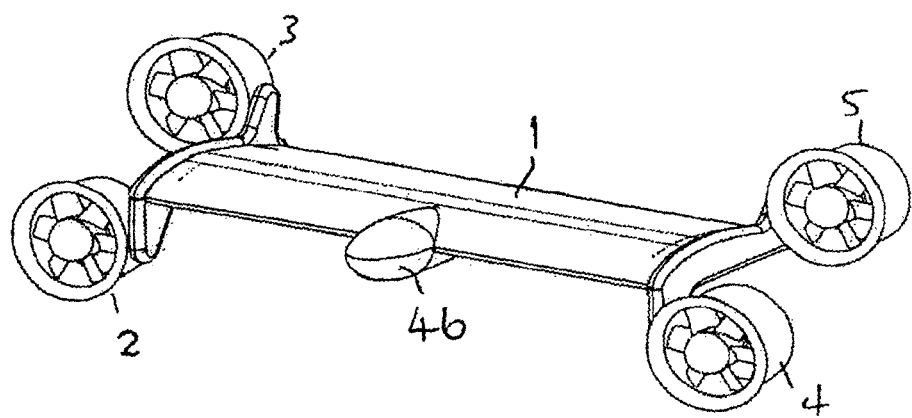
Figure 20:
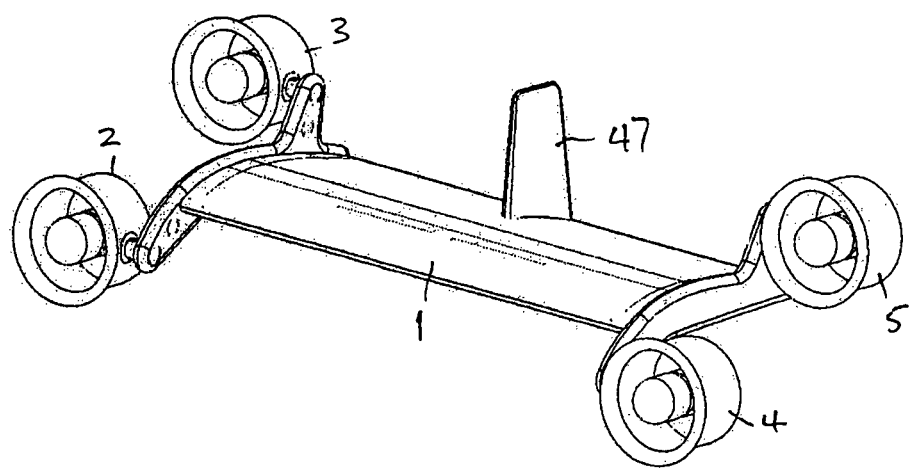

FIG. 18 shows a modification of the thrust-vectoring VTOL flying-wing aircraft of FIG. 1 in which the ducted fan propulsion units 2 to 5 are replaced by open-rotor propulsion units 42 to 45, whereas FIG. 19 shows another modification in which a centrally-located unit 46, which may act as a fuselage or sensor pod, is added; clearly the added unit 46 may be extended where, for example, a larger fuselage-capacity is required. As an alternative modification, or in addition, a tail stabiliser 47 as illustrated by FIG. 20, may be added for improved lateral stability.

Figure 21:
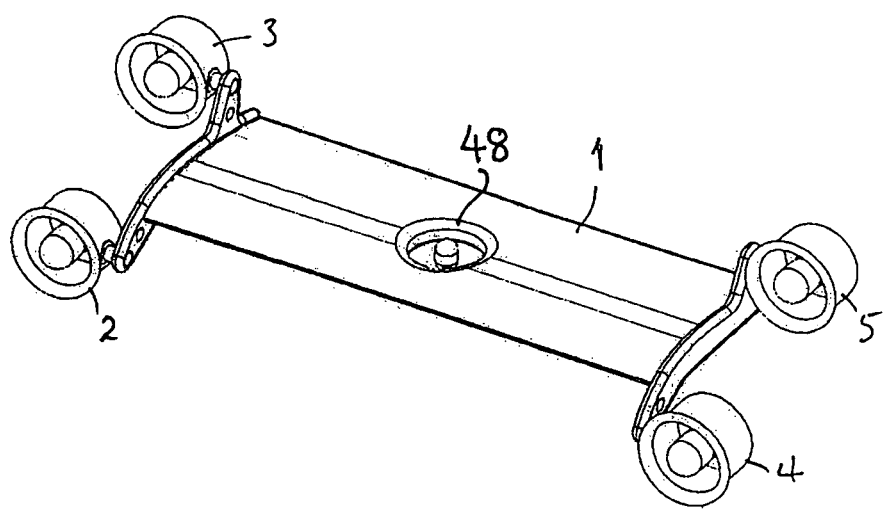

As a further possible modification, a central fan unit 48 may be added as illustrated by FIG. 21, for augmenting lift. This can be advantageous for large wing-span designs of flying-wing aircraft which, by their very nature, are likely to be heavier than a shorter-wing design. With a central lift-fan, less lift for hover is required from the vectored-thrust propulsion units 2 to 5.

A further example of a VTOL flying-wing aircraft according to the invention will now be described with reference to FIG. 22 to 24.

Figure 22:
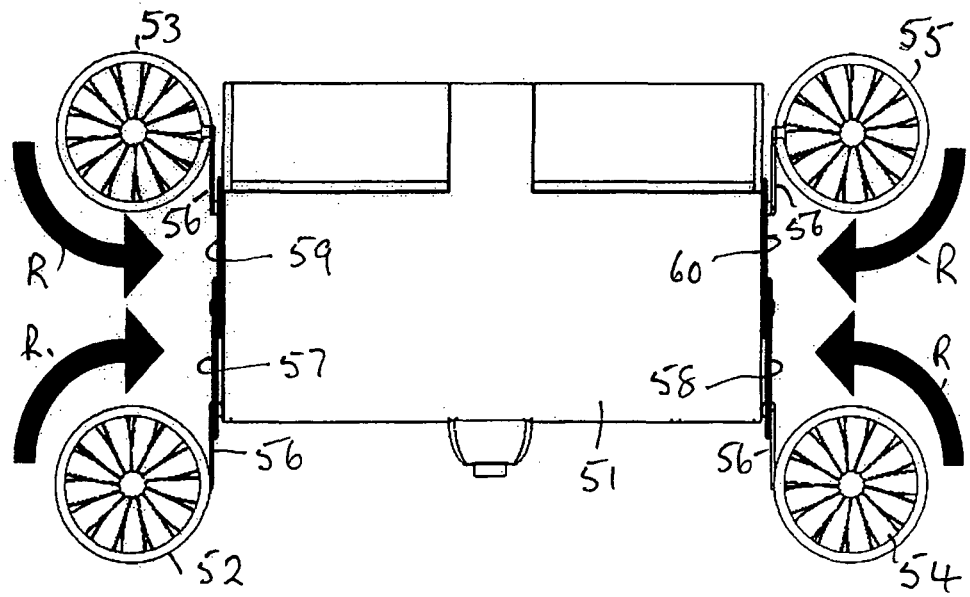
FIGS. 22 and 23 are, respectively, plan and perspective views of another thrust-vectoring VTOL flying-wing aircraft according to the invention, in the hover condition.
Figure 23:
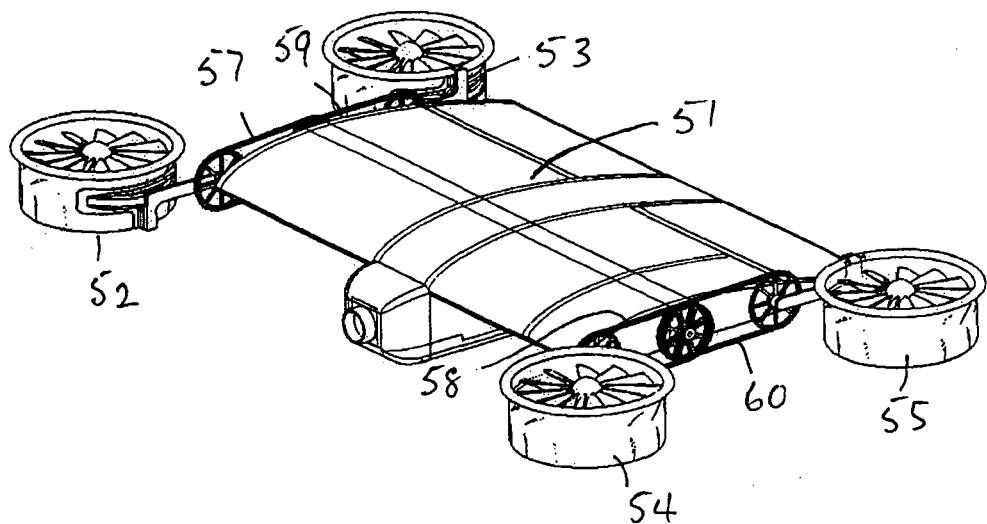
Figure 24:
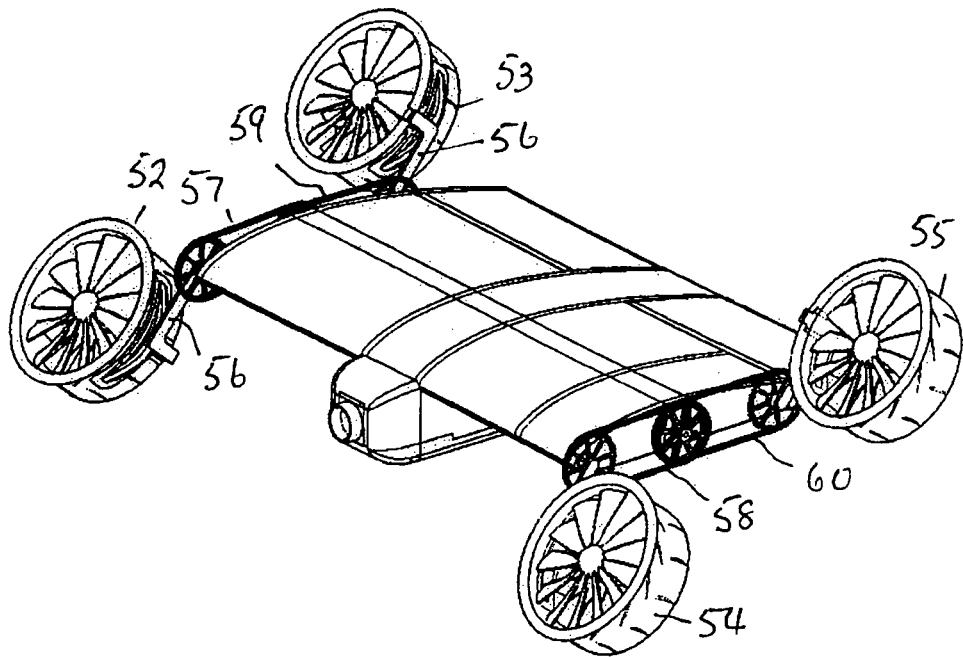
FIG. 24 is a perspective view of the flying-wing aircraft of FIGS. 22 and 23 in a forward-flight condition.

Referring to FIGS. 22 to 24, the wing-structure 51 in this example has four thrust-vectoring propulsion units 52 to 55 with the units 52 and 53 mounted fore and aft respectively at the starboard wing-tip of the structure 51, and the units 54 and 55 mounted correspondingly fore and aft at the port wing-tip. Each unit 52 to 55 is carried by an individual arm 56 that is pivoted to the wing-structure 51. The arms 56 carrying the units 52 and 54 are pivotably-mounted on the starboard and port wing-tips respectively for independent pivotal displacement relative to the wing-structure 51 about a forward axis parallel to the pitch axis of the aircraft. The pivotal displacement of each of these two arms 56 relative to this forward axis is controlled via chain drives 57 and 58. Correspondingly, the arms 56 carrying the units 53 and 55 are pivotably-mounted on the starboard and port wing-tips respectively for independent angular displacement relative to the wing-structure 51 about a rearward axis parallel to the pitch axis of the aircraft, and pivotal displacement of each of these two arms 56 relative to this axis is controlled via chain drives 59 and 60.

The arms 56 are shown in FIGS. 22 and 23 pivoted into horizontal alignment with the wing-structure 51 to position the propulsion units 52 to 55 for hover of the aircraft. The units 52 to 55 in this disposition of the arms 56 are oriented to direct thrust vertically down. More particularly, in this disposition the two arms 56 carrying the units 52 and 53 on the starboard side are folded away from one another, and similarly the two arms 56 carrying the units 54 and 55 on the port side are folded away from one another so that the units 52 and 53 and the units 54 and 55 are at maximum separation. This provides for good stability and balance of the aircraft in the hover.

FIG. 24 shows the disposition of the propulsion units 52 to 55 for forward flight. In this case the arms 56 carrying the units 52 and 54 have been driven by their chain drives 57 and 58 to be inclined forwards downwardly from the horizontal, and the arms 56 carrying the units 53 and 55 have been driven by their chain drives 59 and 60 to be inclined rearwards upwardly from the horizontal, so that thrust from all units 52 to 55 is vectored rearwardly as well as partially downwardly for lift. The downward movement of the arms 56 carrying the units 52 and 54, and the upward movement of the arms 56 carrying the units 53 and 55 ensures that there is an appropriate out-of-alignment separation between the units 52 and 53 and the units 54 and 55.

For improved balance and counteraction of inertial effects, the fans/rotors of the units 53 and 54 are arranged to rotate in the opposite sense to those of the units 52 and 55. The sense of rotation for each unit 52 to 55 is indicated in FIG. 22 by an arrow R.

Figure 25:
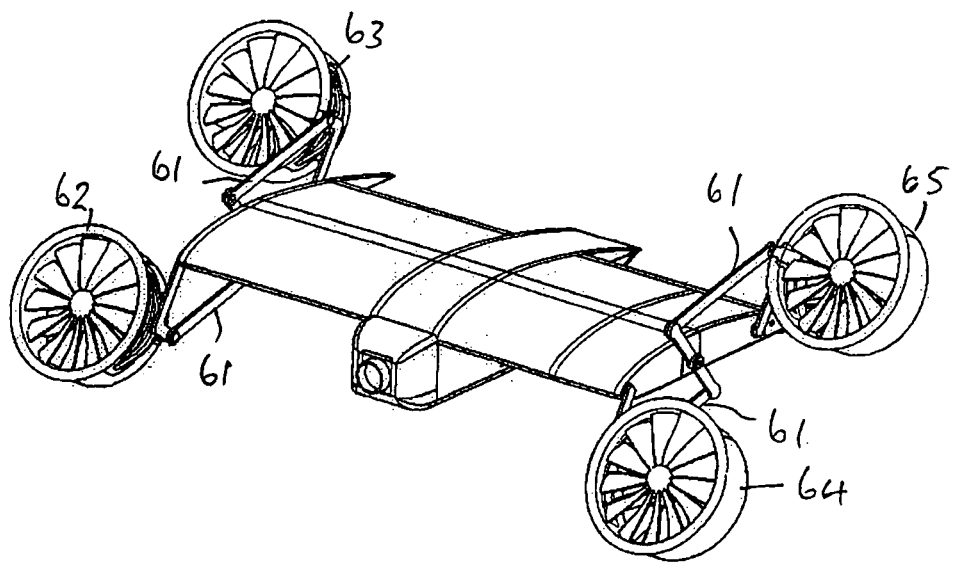
FIG. 25 is a perspective view of another thrust-vectoring VTOL flying-wing aircraft according to the invention, in a forward-flight condition.

FIG. 25 is illustrative of an alternative flying-wing aircraft that is functionally comparable with that of FIGS. 22 to 24, but in which crank-arm linkages 61 instead of chain drives, are used for angular displacement of the propulsion units 62 to 65.

In the flying-wing aircraft illustrated in FIGS. 22 to 25, the propulsion units 52 to 55 and 62 to 65 are carried by pivoted arms 56 and linkages 61 to provide angular displacements required for thrust-vectoring. However, by way of modification, the thrust-producing units 52 to 55 may be pivoted to their respective arms 56, and the units 62 to 65 may be pivoted to the respective linkages 61 so that in each case a further or alternative axis for control of vectoring is introduced.

Figure 26:
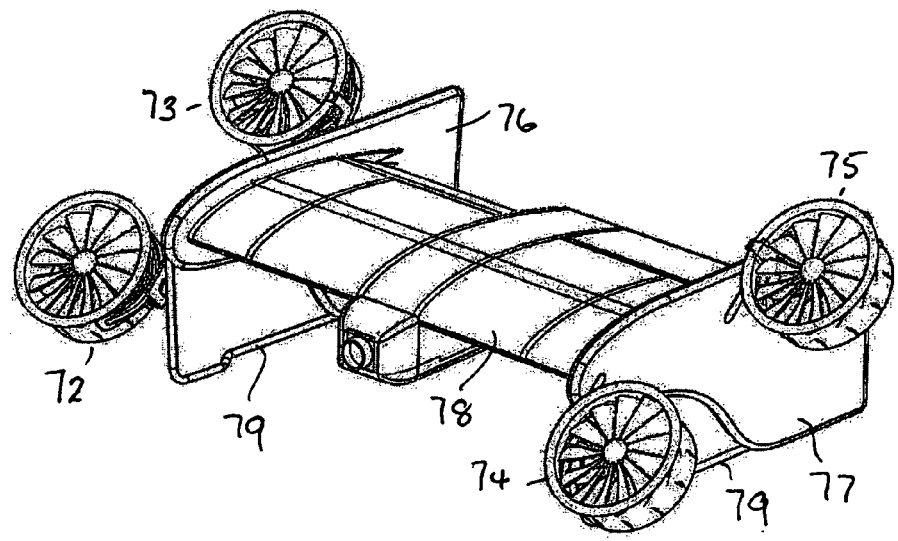
FIG. 26 is a perspective view from the front of a preferred form of flying-wing aircraft according to the invention.

A preferred form of flying-wing aircraft according to the invention is illustrated in FIG. 26 and involves two pairs of front-and-rear propulsion units 72 and 73 and 74 and 75 that are moved pivotally by individual chain drives (not shown) located within vertical fins or wing-strakes 76 and 77 respectively. The strakes 76 and 77 (the shaping of which may vary from that illustrated) afford improved longitudinal stability to the aircraft during forward flight and forward-flight manoeuvres. Typically, the strakes 76 and 77 are each of larger surface area to the rear than to the front of the aircraft (so as to give a 'weather-vane' aligning effect). The increase in surface area from front to rear may be above and/or below the wing-structure 78, but in the aircraft of FIG. 26, where the increase is below the wing-structure 78, there is the advantage that they contribute, together with open-frames 79, to the provision of landing-gear for the aircraft.

Yaw stabilization and/or control of the flying-wing aircraft of FIG. 26 may be provided by varying the thrust provided as between the starboard propulsion units 72 and 73 and the port propulsion units 74 and 75. However, each strake 76 and 77 of the flying-wing aircraft of FIG. 26 may, as illustrated in FIG. 27, incorporate a yaw-stabiliser or rudder 80 for use as an alternative or in addition to the use of thrust-variation.

Figure 28:
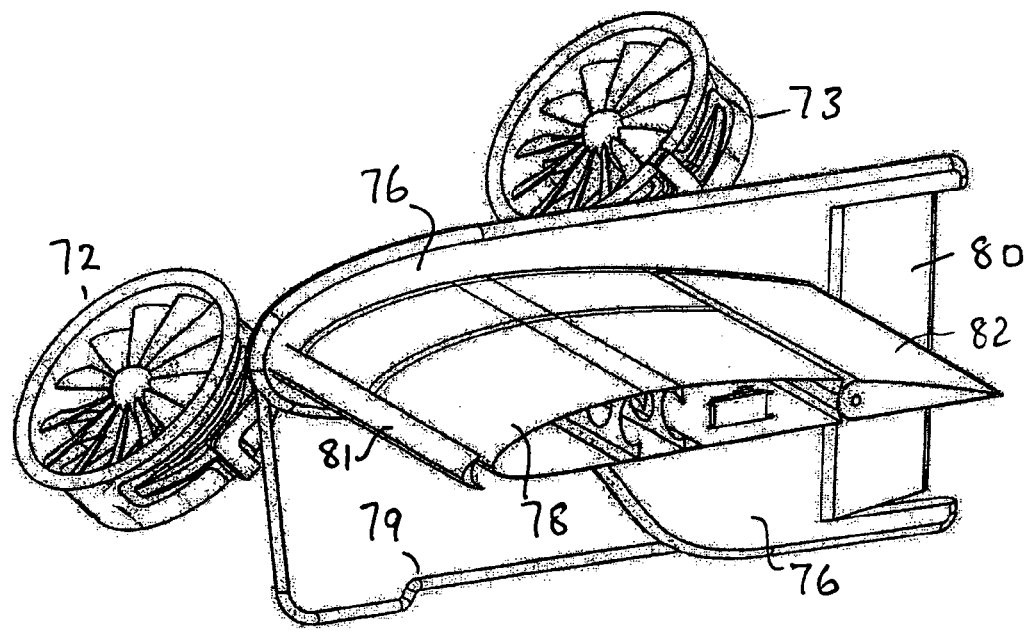
FIG. 28 is a sectional view of the flying-wing aircraft of FIG. 27 incorporating further modification.

FIG. 28 shows a further modification of the flying-wing aircraft of FIG. 26, in which the wing-structure 78 has a leading-edge slat 81 to improve the range of the angle-of-attack of the wing before stalling.

Figure 27:
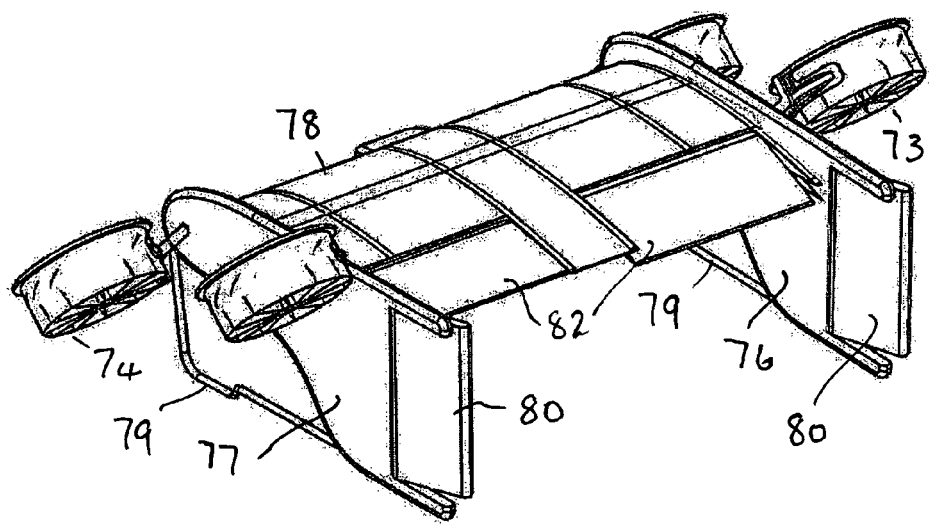
FIG. 27 is a perspective view from the rear of a modified form of the flying-wing aircraft of FIG. 26.

The flying-wing aircraft of FIGS. 26 to 28 include flaps/elevators 82 that are most-clearly seen in FIGS. 27 and 28.

Figure 29:
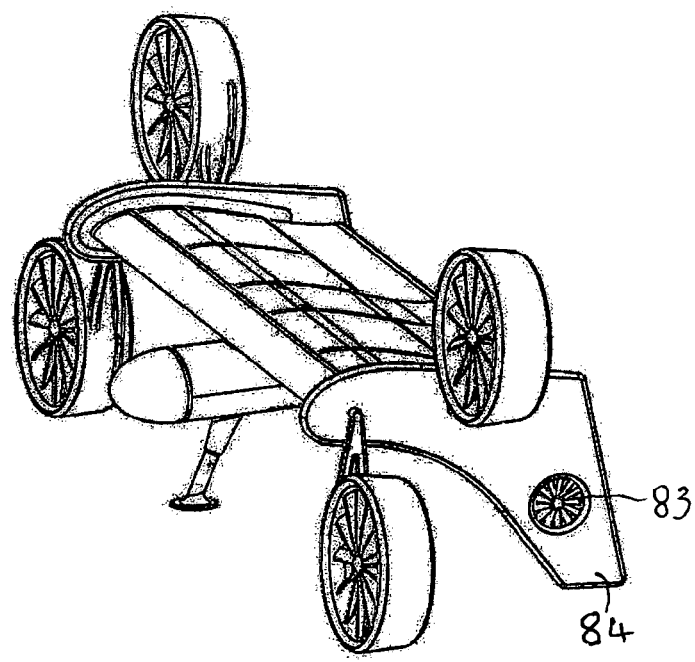
FIG. 29 is illustrative of further modification of the flying-wing aircraft.

A further possible modification, which is illustrated in FIG. 29, involves the mounting of a fan unit 83 in each of the wing strakes or vertical fins 84 of the aircraft. The units 83 provide thrust in opposite lateral directions to give a mechanism for added, or alternative, yaw control and stabilisation. The control is effected simply by varying the thrusts they produce relative to one another.

The thrust-vectoring VTOL flying-wing aircraft of the present invention overcomes many of the problems associated with conventional fixed-wing aircraft-structures and rotorcraft. Use of the flying-wing structure enables aircraft-weight to be reduced to an absolute minimum, in that the requirement for a fuselage and flight-control surfaces such as a tail-plane and/or elevators and their associated actuators, is avoided. By suitable design, the flying-wing aircraft of the present invention is not only stable, but can outperform other types of fixed-wing aircraft or rotorcraft in gusty breezes. Furthermore, recovery from gust stalls can be instantaneous without loss of altitude. Advanced designs of flying-wing aircraft according to the invention, incorporating, for example slats and flaps, can deliver higher coefficients of lift, enabling such aircraft to fly at very low speeds on full wing-borne lift.

The VTOL flying-wing aircraft of the present invention may also be provided as a radio-controlled model aircraft, and in this respect may be provided for sale in kit form.

The invention claimed is:

1. A vertical take-off and landing flying-wing aircraft having a unitary wing-structure and a fore-aft axis, wherein:
    (a) the unitary wing-structure comprises a single elongate wing extending laterally to each side of the fore-aft axis, the single elongate wing having a single extremity located on either side of the fore-aft axis, and the single elongate wing is the sole wing of the vertical take-off and landing flying wing aircraft;
    (b) a single pair of thrust-vectoring propulsion units is mounted at each single extremity of the single unitary elongate wing via a mounting that is individual to the pair of thrust-vectoring propulsion units and operatively interlinking the two thrust-vectoring propulsion units with one another, and each of the pair of thrust-vectoring propulsion units being independently pivotable about an axis which is fixed relative to the unitary wing-structure; and
    (c) each thrust-vectoring propulsion unit is operable to produce a vector thrust selectively and variably between downwards for lift and rearwards for forward flight.

2. The vertical take-off and landing flying-wing aircraft according to claim 1, wherein each of the single pair of thrust-vectoring propulsion units is also operable to vector thrust produced by the thrust-vectoring propulsion units selectively and variably forwards for one of rearward manoeuvre and rearward flight of the aircraft.

3. The vertical take-off and landing flying-wing aircraft according to claim 1, wherein each of the single pair of thrust-vectoring propulsion units is operable to vector thrust from the thrust-vectoring propulsion units angularly about an axis parallel to a pitch axis of the aircraft.

4. The vertical take-off and landing flying-wing aircraft according to claim 1, wherein the two thrust-vectoring propulsion units of each single pair of thrust-vectoring propulsion units are spaced equidistant forward and aft respectively of a center of gravity of the aircraft.

5. The vertical take-off and landing flying-wing aircraft according to claim 1, wherein axes about which the thrusts of the two thrust-vectoring propulsion units of each single pair of thrust-vectoring propulsion units are vectored are located, respectively, above and below a central plane of the unitary wing-structure.

6. The vertical take-off and landing flying-wing aircraft according to claim 1, wherein axes about which the thrusts of the two thrust-vectoring propulsion units of each single pair of thrust-vectoring propulsion unites are vectored are axes fixed with respect to the unitary wing-structure.

7. The vertical take-off and landing flying-wing aircraft according to claim 1, wherein axes about which the thrusts of the two thrust-vectoring propulsion units of each single pair of thrust-vectoring propulsion units are vectored are displaceable with respect to the unitary wing-structure.

8. The vertical take-off and landing flying-wing aircraft according to claim 1, wherein each of the propulsion units is operable to vector thrust angularly about both an axis parallel to a roll axis of the aircraft and one of a pitch axis of the aircraft and an axis parallel to the pitch axis.

9. The vertical take-off and landing flying-wing aircraft according to claim 1, wherein a center of gravity of the aircraft is located forward of an aerodynamic center of lift of the unitary wing-structure within a range of 0 to 15% of a maximum wing chord of the aircraft.

10. The vertical take-off and landing flying-wing aircraft according to claim 1, wherein the fixed axis is one of a pitch axis of the aircraft and an axis parallel to the pitch axis.

11. The vertical take-off and landing flying-wing aircraft according to claim 1, wherein each thrust-vectoring propulsion unit is mounted on a respective pivotable member for angular displacement about an individual first axis defined in the respective pivotable member, and the respective pivotable member is pivotable about an individual second axis fixed relative to the unitary wing-structure such that orientation of each individual thrust-vectoring propulsion unit is variable.

12. The vertical take-off and landing flying-wing aircraft according to claim 11 wherein the first and the second axes are both parallel to a pitch axis of the aircraft.

13. The vertical take-off and landing flying-wing aircraft according to claim 11, wherein drive for pivotal movement of the pivotable member is via one of a gear, a chain and a lever mechanism within the mounting.

14. The vertical take-off and landing flying-wing aircraft according to claim 1, wherein each of the thrust-vectoring propulsion units of each single pair of thrust-vectoring propulsion units is mounted for angular displacement for vectoring on respective pivotable members, and control means is operable to control the pivotable members of each said single pair of thrust-vectoring propulsion units selectively for forward flight and hover of the aircraft, the control means is operative for forward flight of the aircraft to locate the two thrust-vectoring propulsion units of each said single pair of the thrust-vectoring propulsion units one above the other relative to the wing-structure, and is operative for hover of the aircraft to locate the two thrust-vectoring propulsion units of the respective single pair of thrust-vectoring propulsion units in horizontal alignment with one another.

15. The vertical take-off and landing flying-wing aircraft according to claim 14, wherein the pivotable members of the two thrust-vectoring propulsion units of each single pair of thrust-vectoring propulsion units mounted at each single extremity of the single elongate wing are pivoted away from one another for hover of the aircraft.

16. A vertical take-off and landing flying-wing aircraft having a unitary wing-structure and a fore-aft axis, wherein:

(a) the unitary wing-structure comprises a continuous single elongate wing extending laterally to each side of the fore-aft axis and generally defining a plane, the single elongate wing having a single extremity located at each side of the fore-aft axis, and the single elongate wing is the sole wing of the vertical take-off and landing flying wing aircraft;

(b) a single pair of thrust-vectoring propulsion units being mounted at each single extremity of the single elongate wing via a mounting that is individual to the pair of thrust-vectoring propulsion units and operatively interlinking the two thrust-vectoring propulsion units with one another, and each of the pair of thrust-vectoring propulsion units being independently pivotable about an axis which is fixed relative to the unitary wing-structure; and (c) each thrust-vectoring propulsion unit is operable to vector thrust produced by each thrust-vectoring propulsion unit selectively and variably between downward for lift and rearward for forward flight; and the wing-structure has one of a V-tail and at least one central, stabilizer tail-fin.

17. A vertical take-off and landing flying-wing aircraft having a fore-aft axis, the aircraft comprising:

(a) a single elongate wing extending laterally to each side of the fore-aft axis, the elongate wing terminating in a single wing-extremity of the single elongate wing located on either side of the fore-aft axis;

(b) two thrust-vectoring propulsion units mounted at each single wing-extremity of the single elongate wing via a mounting that is individual to the two thrust-vectoring propulsion units and operatively interlinking the two thrust-vectoring propulsion units with one another, the two thrust-vectoring propulsion units at each respective single wing-extremity of the single wing being carried on respective individual arms that are independently pivotable to the respective wing-extremity fore and aft of one another; and (c) a drive mechanism at each single wing-extremity, the drive mechanism at each respective single wing-extremity intercoupling the pivoted arms of the two thrust-vectoring propulsion units mounted at the respective wing-extremity for varying the angular displacement of these two thrust-vectoring propulsion units relative to the single elongate wing.

18. The vertical take-off and landing flying-wing aircraft according to claim 17, wherein the drive mechanism at each respective single wing-extremity comprises one of a gear, a chain and a lever mechanism.

19. The vertical take-off and landing flying-wing aircraft according to claim 17, wherein the drive mechanism at each respective single wing-extremity comprises a crank-arm linkage.

20. The vertical take-off and landing flying-wing aircraft according to claim 17, wherein each of the thrust-vectoring propulsion units, mounted at each single wing-extremity of the single elongate wing, is pivotably mounted on the respective individual arm.

* * * * *